Oct. 10, 1933.  C. SCHLOTTERHOSE  1,929,856
APPARATUS FOR PRODUCING ANIMAL FOOD
Filed Jan. 30, 1931
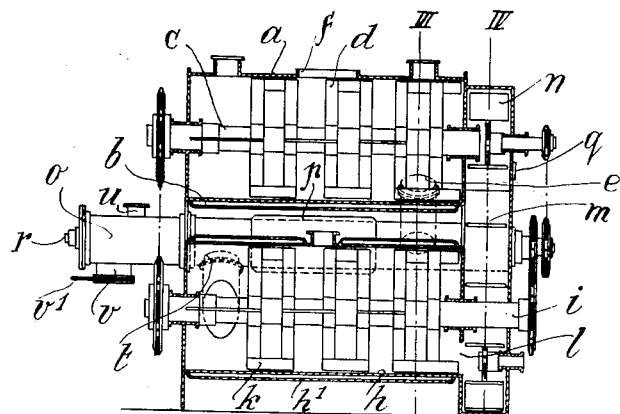
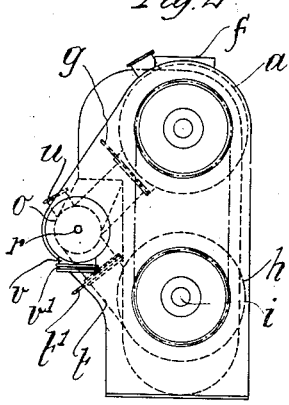
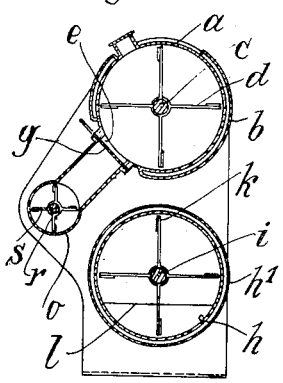
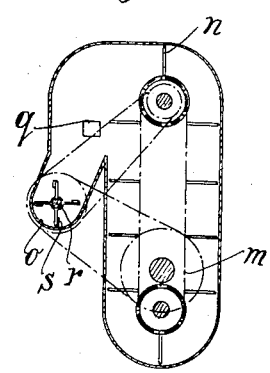
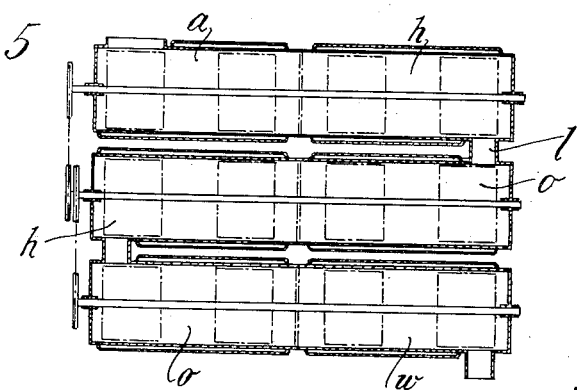

Patented Oct. 10, 1933

1,929,856

UNITED STATES PATENT OFFICE 1,929,856

APPARATUS FOR PRODUCING ANIMAL FOOD

Conrad Schlotterhose, Wesermunde-Wulsdorf, Germany

Application January 30, 1931, Serial No. 512,426, and in Germany November 26, 1930

2 Claims. (Cl. 99—2)

I have filed application in Germany under date of Nov. 26, 1930 and in Great Britain Jan. 9, 1931.

In the existing fish and slaughterhouse refuse utilization plants no particular difficulties exist in the treatment of material containing fat, both in continuous and also in intermittent working. For intermittent, so-called working in charges ordinary horizontal apparatus are sufficient with double heating jacket and built-in stirring mechanism which thoroughly works the material and thus enables a uniform drying. Rotary drying drums provided with steam jacket may also be employed for this purpose.

However the working of lean material, that is in which not more than 2 to 3% of oil is contained in the dry product, presents the difficulty that, as soon as a certain percentage of moisture is removed, the glue producing fibres adhere to the heating walls and impede or entirely prevent further drying. Consequently the time of treating a charge is considerably prolonged and in many instances the drying must even be interrupted in order to clean the heating surfaces. Moreover it has been positively ascertained, that the adhering portions are charred or burned, so that the quality of the resultant finished product (meat or fish flour) is detrimentally affected. It has been endeavoured to overcome this objection by drawing off the glue liquor after sterilization, the remaining material, which has no longer any tendency to cake, being then dried without trouble. This method is however, open to the objection that, by drawing off the glue liquor, important nutritive substance (nitrogen compounds) are lost so that the quality of the finished product is considerably lowered.

All these objections are obviated by the invention, which consists in that the adhesive property of the glue, which causes the caking on the heating surfaces, is neutralized by a single or repeated cooling of the material between the heating periods, if necessary under vacuum or with the admission of air during the individual working periods.

Owing to the sudden cooling of the sterilized material as soon as its moisture has sunk to a certain degree, it loses its adhesive property. The subsequent final drying to the desired degree of moisture can easily be effected without any danger that the material will cake on the heating surfaces.

Further features of the invention consist in the special construction of the apparatus for carrying out the method.

The invention can be carried out in various manners. Two forms of construction are illustrated by way of example in the accompanying drawing, in which Fig. 1 shows the apparatus in longitudinal section.

Fig. 2 is a side elevation of Fig. 1.

Fig. 3 is a section on line III—III of Fig. 1.

Fig. 4 is a section on line IV—IV of Fig. 1.

Fig. 5 shows diagrammatically a modified form of construction in front elevation.

A horizontal completely closed drum $a$ with heating jacket $b$ serves for sterilizing the material, a connection for direct steam supply may also be provided specially for the sterilization of slaughterhouse refuse. This sterilization is carried out at a more or less high temperature according to the material to be treated, fish waste or slaughterhouse refuse. A stirring mechanism $d$ mounted on a shaft $c$ is built into the drum $a$, and effects a thorough working of the material, thus enabling a uniform sterilization, this stirring mechanism also conveying the material to a discharge aperture $e$. The raw material is charged through an easily closable aperture $f$ and after sterilization passes out into a drum $h$ situated thereunder, through the discharge aperture $e$, which can be closed by a shutter $g$. The transition from the upper drum $a$ to the lower drum $h$ may be either direct or, as shown in the drawing, with interposition of a drum $o$ hereinafter described, provided with conveying mechanism and serving chiefly for cooling. The drum $h$ also has a heating jacket $h_1$ and a stirring mechanism $k$ mounted on a shaft $i$, said mechanism thoroughly working the material and conveying it to the discharge aperture $l$. The material passes through the aperture $l$ into a laterally arranged elevator, the buckets $n$ of which convey the material to a separate apparatus, for example the drum $o$. This drum $o$ also has a jacket $p$ which is arranged so that the material contained in the apparatus may be cooled by introducing cooling water into the jacket $p$. At the same time air can be supplied in any suitable manner through a vent $q$ adjustable by a shutter or the like.

As soon as the glue is bound in the material, this drum $o$ may also be employed for drying by admitting steam into its jacket $p$.

A separate stirring mechanism $s$ is mounted on a shaft $r$ of the drum $o$ and removes the material from the elevator $m$. The material can also be returned to the drum $h$ from the drum o through a suitable chute t also adapted to be closed by a shutter t¹.

In this manner it is possible to obtain a circulation of the material within the drum h and the drum o, the material being alternately heated and cooled. After the binding of the glue the drying takes place in both drums, the vapors produced being sucked off through discharge pipes u by means of an exhauster or a vacuum pump. However at the same time the drum o above the lower drum h is extended so that the finished material is supplied to a discharge chute v which can be closed by a shutter v₁ and, on the chute v being opened, the material can be sacked at this point, the chute t being closed by the shutter t'. As the emptying is effected through the drum o, the finished material can at the same time be cooled by supplying cooling water into the jacket p, so that it is directly ready for sacking, and a separate cooling in the air is therefore not necessary. This is very desirable in the interests of good quality and durability of the finished material.

Fig. 5 shows the apparatus for continuous working. In this instance the material is introduced into the sterilizing chamber a, whence it passes into the drying chamber h, from this through the aperture l into the cooling chamber o, hence again into a drying chamber h and from here into a second cooling chamber o and then into the final drying chamber w.

All the chambers are provided with stirring mechanisms and conveying devices so that the material is sterilized, preliminarily dried, cooled, again dried and finally dried in continuous working. The arrangement may be such that an alternating cooling and drying may be repeated several times.

Evidently the device for continuous working can also be constructed in a different manner.

The apparatus may be erected either on land or particularly directly on board ship. It presents the advantage of requiring a minimum amount of space. A further advantage is, that it is capable of working in any position.

The jacket p of the cooling chamber may also be connected to heating devices by connecting sockets in order, if necessary, to employ this chamber o also for drying as above indicated.

I claim:—

1. In apparatus of the class described, an elongated tubular cooking chamber, an elongated tubular drying chamber spaced below the cooking chamber and parallel thereto, a third elongated tubular chamber opposite the space between said cooking and drying chambers and parallel to said chambers, a tube leading downwardly from the lower part of the first chamber at one end of the third chamber and communicating with the latter at the upper part thereof, a cut off slide in said tube adjacent the first chamber, a second tube leading downwardly from the lower part of the third chamber at the other end thereof and opening into the second chamber at the upper part thereof, means to selectively heat and cool the third chamber whereby material in the said third chamber is alternately heated and cooled, a conveyor housing into which the first and second chambers open at one end of each, and a conveyor in said housing whereby material may be conveyed from the second to the third chamber without passing through said tubes.

2. In apparatus of the class described, an elongated tubular cooking chamber, an elongated tubular drying chamber spaced below the cooking chamber and parallel thereto, a third elongated tubular chamber opposite the space between said cooking and drying chambers and parallel to said chambers, a tube leading downwardly from the lower part of the first chamber at one end of the third chamber and communicating with the latter at the upper part thereof, a cut off slide in said tube adjacent the first chamber, a second tube leading downwardly from the lower part of the third chamber at the other end thereof and opening into the second chamber at the upper part thereof, means to selectively heat and cool the third chamber whereby material in the said third chamber is alternately heated and cooled, a conveyor housing into which the first and second chambers open at one end of each, and a conveyor in said housing whereby material may be conveyed from the second to the third chamber without passing through said tubes, said housing being provided with an adjustable air admission port.

CONRAD SCHLOTTERHOSE.